US005351403A

United States Patent [19]

Becker et al.

[11] Patent Number: 5,351,403

[45] Date of Patent: Oct. 4, 1994

[54] PROTECTIVE SHIELD FOR A FREE-CUTTING TOOL

[75] Inventors: Georg Becker, Winnenden; Joachim Hoffmann, Aichwald; Thilo Hummel, Schwaikheim; Josef Karner; Helmut Schlessman, both of Waiblingen, all of Fed. Rep. of Germany

[73] Assignee: Firma Andreas Stihl, Waiblingen, Fed. Rep. of Germany

[21] Appl. No.: 145,868

[22] Filed: Nov. 1, 1993

[30] Foreign Application Priority Data

Nov. 5, 1992 [DE] Fed. Rep. of Germany ....... 4237357

[51] Int. Cl.[5] .............................................. A01D 75/18

[52] U.S. Cl. ........................................ 30/276; 30/285; 30/286

[58] Field of Search ...................... 30/276, 277.4, 284, 30/285, 286, 347; 56/12.7

[56] References Cited

U.S. PATENT DOCUMENTS

| | | | |
|---|---|---|---|
| 4,550,499 | 11/1985 | Ruzicka | 30/276 |
| 4,641,431 | 2/1987 | Leming et al. | 30/276 |
| 4,651,422 | 3/1987 | Everts | 30/347 |
| 4,823,464 | 4/1989 | Gorski | 30/276 |
| 4,864,728 | 9/1989 | Kloft et al. | 30/286 X |

*Primary Examiner*—Rinaldi I. Rada

*Attorney, Agent, or Firm*—Robert W. Becker & Associates

[57] ABSTRACT

A protective shield for a free-cutting tool having a rotatable cutting head with a cutting thread that extends radially upon rotation of the cutting head and thus defines a cutting plane, has a support section for fixedly connecting the shield to the tool above the cutting plane. A circumferential wall is connected to the support section and extends about a portion of the circumference of the cutting plane. The circumferential wall extends axially from the support section to at least the cutting plane and has axially extending lateral edges arranged perpendicular to a direction of rotation of the cutting head. The lateral edges each have a round transition into a bottom edge of the circumferential wall. A crosscutting blade for cutting to length the cutting thread is connected to the inside of the circumferential wall at its leading portion in the direction of rotation. The crosscutting blade extends over the axial height of the circumferential wall. At the leading portion the round transition has a projection positioned in the direction of rotation in front of the crosscutting blade. The projection ensures that a cutting thread of an excess length is bent and forced to enter into the protective area of the protective shield to be cut to length.

11 Claims, 4 Drawing Sheets

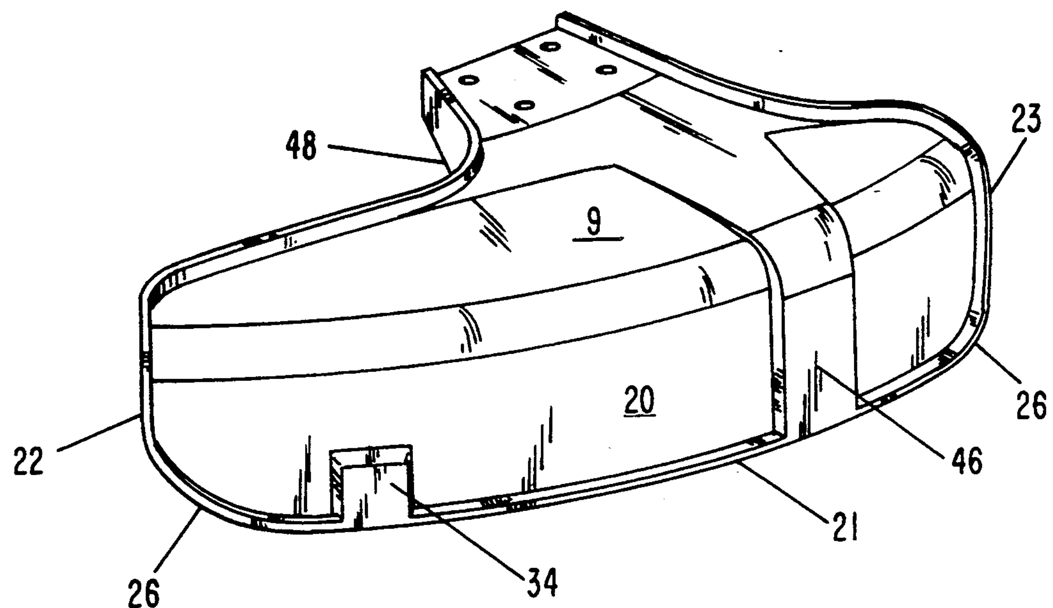
FIG—2
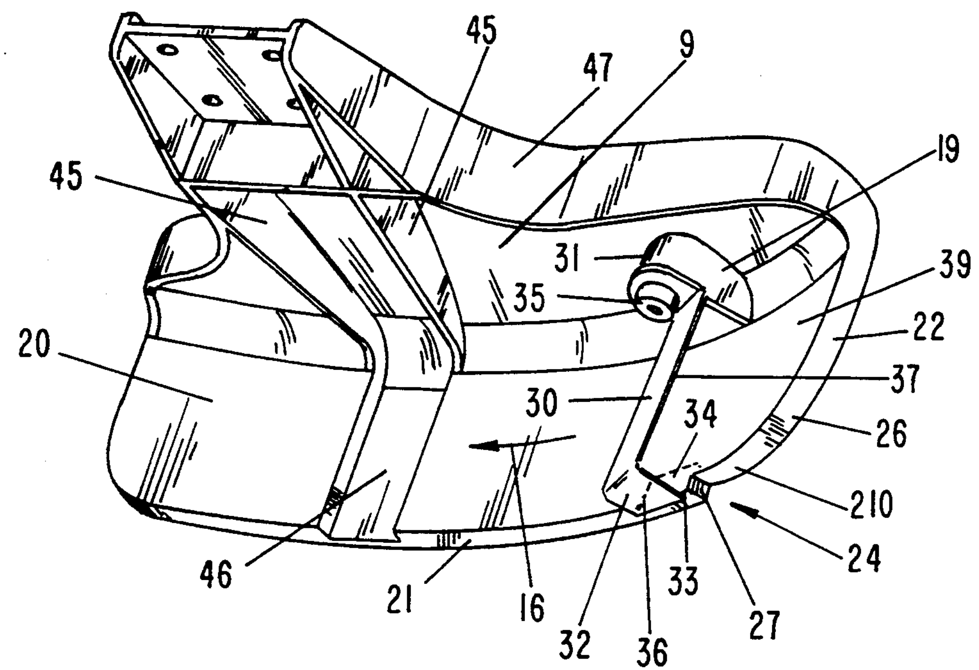
FIG—3

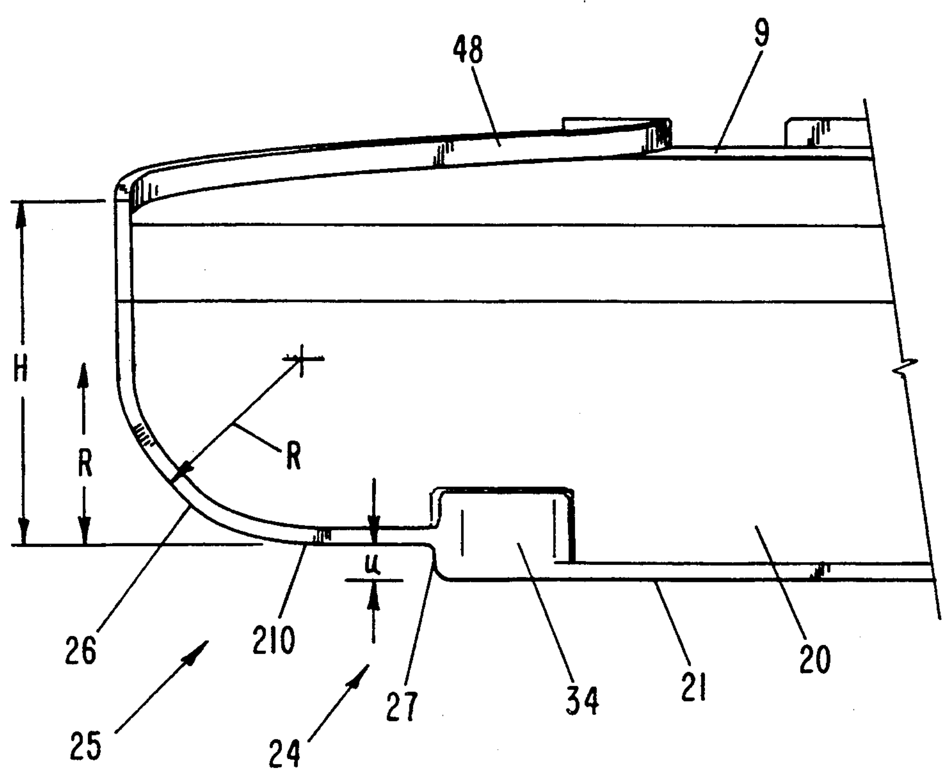
FIG—4

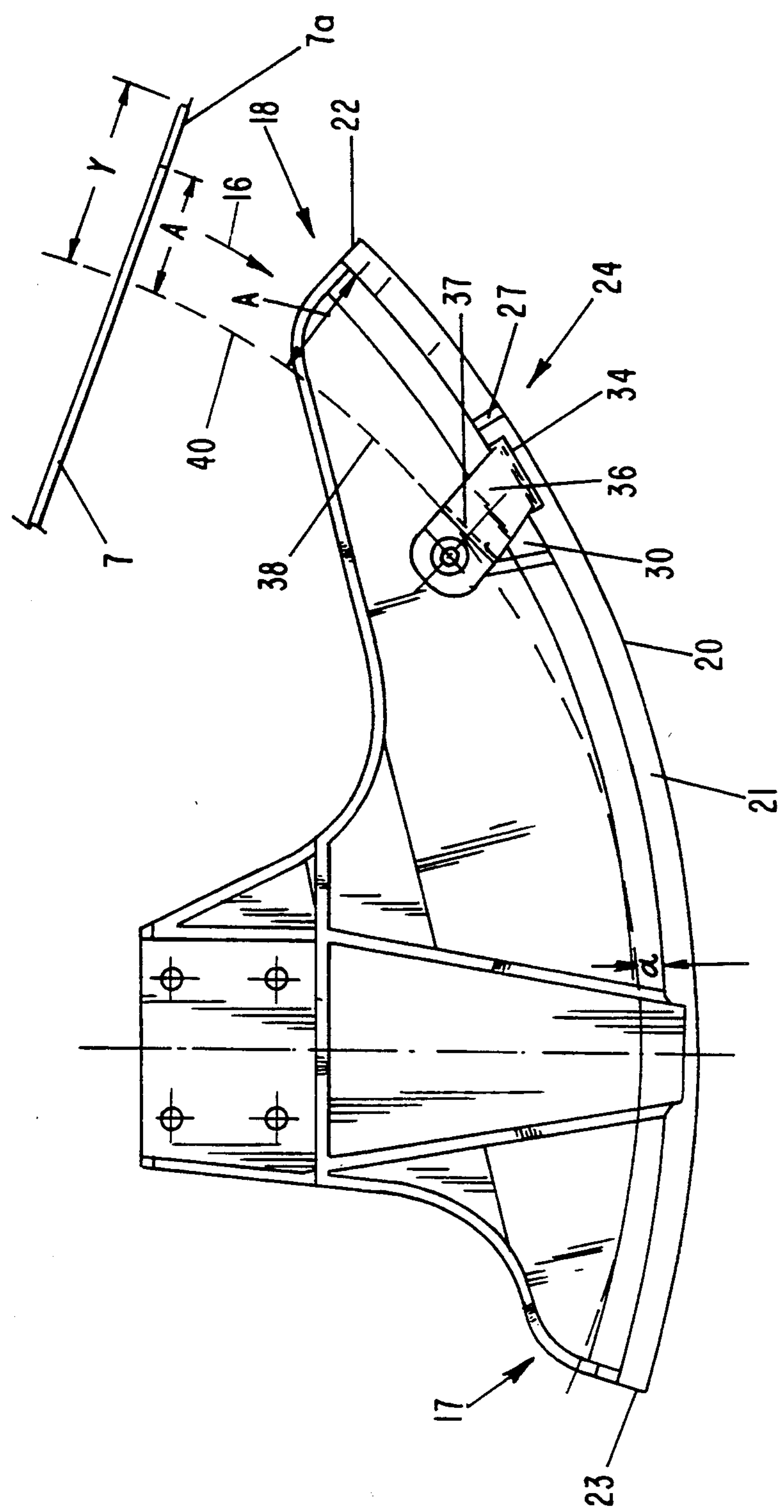
FIG—5

PROTECTIVE SHIELD FOR A FREE-CUTTING TOOL

The present invention relates to a protective shield for a free-cutting tool having a cutting head rotating about an axis of rotation and a cutting cord which upon rotation of the cutting head extends substantially radial to the axis of rotation and forms a cutting plane within the protective shield. The protective shield has a support section positioned above the cutting plane which support section supports a circumferential wall extending in the direction of rotation over a portion of the circumference and extending axially at least to the cutting plane. The lateral edges which extend perpendicular to the direction of rotation have a round transition into the bottom edge of the circumferential wall. A crosscutting blade is positioned at the inner side wall of the circumferential wall facing the cutting head and is located within the inlet section of the protective shield. The cutting blade extends substantially over the height of the circumferential wall.

In a free-cutting tool especially with a cutting cord comprised of plastic material the cutting cord undergoes wear so that the cutting cord, after a certain operating time, needs to be renewed. This can be achieved by manually replacing the worn cutting cord with a new one. Preferably however, the cutting head is provided with a cord magazine which via an actuating device (advancing device) feeds a certain length of cutting cord to the cutting head. After a manual replacement of the cutting cord as well as an automatic feeding of the cutting cord from the cord magazine the cutting cord may have such a length that it extends radially past the circumferential wall of the protective shield. Since the lateral edges have a round transition into the bottom edge a cutting cord with overlength is axially deflected at the lateral edge in the direction toward the bottom edge and therefore passes below the crosscutting blade. Accordingly, an operation of the free-cutting tool with a cutting cord of excess length is possible so that the protective shield is essentially ineffective and the operator is thus at risk of being injured. In order to prevent this, the protective shield often is very large which however impedes the handability of the free-cutting tool.

It is therefore an object of the present invention to provide a protective shield for a free-cutting tool of the aforementioned kind that with minimal dimensions and a minimal weight prevents the operation of a free-cutting tool with a cutting thread of excess length.

BRIEF DESCRIPTION OF THE DRAWINGS

This object, and other objects and advantages of the present invention, will appear more clearly from the following specification in conjunction with the accompanying drawings, in which:

FIG. 2 shows an end view of the inventive protective shield;

FIG. 3 shows a perspective view of the inside of the inventive protective shield;

FIG. 4 shows a front view of the inventive protective shield; and

FIG. 5 shows a bottom view of the inventive protective shield.

SUMMARY OF THE INVENTION

Figure 1:
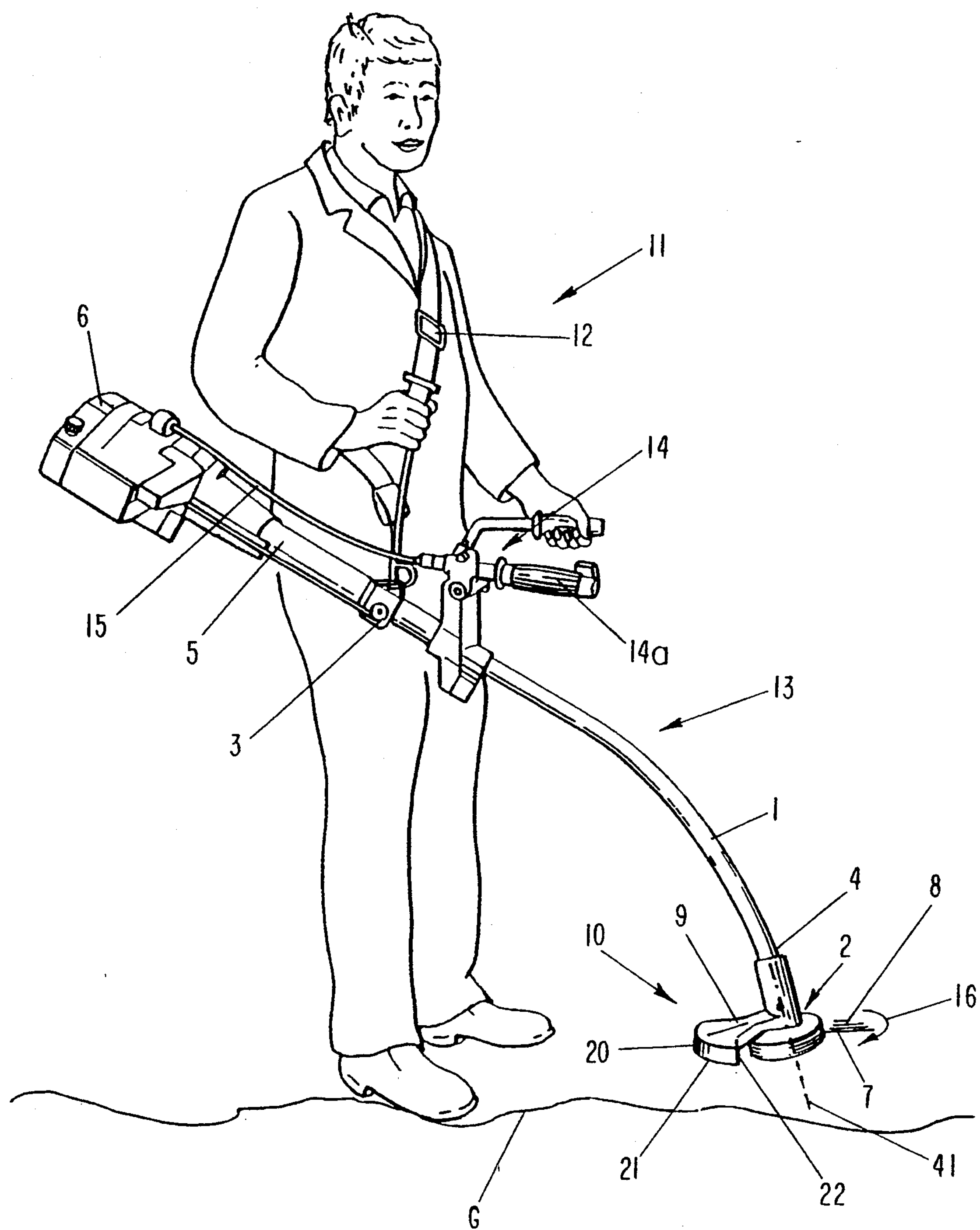
FIG. 1 shows a perspective view of an operator carrying a free-cutting tool with protective shield.

The inventive protective shield for a free-cutting tool of the aforementioned kind according to the present invention is primarily characterized by:

A support section for fixedly connecting the protective shield to the cutting tool above the cutting plane;

A circumferential wall connected to the support section and extending about a portion of a circumference of the cutting plane;

The circumferential wall extending axially from the support section to at least the cutting plane;

The circumferential wall having axially extending lateral edges extending transverse to a direction of rotation of the cutting head;

The circumferential wall having a bottom edge, wherein the lateral edges have a round transition into the bottom edge;

A crosscutting blade for cutting to length the cutting thread, the crosscutting blade connected to an inner wall surface of the circumferential wall at a leading portion of the circumferential wall in the direction of rotation and extending substantially over an axial height of the circumferential wall; and Wherein at the leading portion of the circumferential wall the round transition into the bottom edge has a projection positioned in the direction of rotation in front of the crosscutting blade.

Preferably, the projection is positioned substantially at a cutting edge of the crosscutting blade. Advantageously, the cutting edge is positioned in a plane intercepting as a tangent a circle described by the cutting thread. Expediently, the circumferential wall has a first radius of curvature greater than a second radius of curvature of the circuit described by the cutting thread. The point of origination of the first radius is displaced with respect to the point of origination of the second radius.

Expediently, the projection is a step between the round transition and the bottom edge. The round transition preferably connects to an inlet section of the bottom edge, the inlet section being spaced at an axial distance to the bottom edge and the step connecting the inlet section to the bottom edge. In a preferred embodiment of the present invention, the step has an abutment surface in the direction of rotation, the abutment surface being perpendicular to the cutting plane.

Expediently, the crosscutting blade has a first angular end for connecting it to the support section and a second U-shaped end with a free leg. The circumferential wall preferably has a receiving pocket for receiving the free leg.

Preferably, the step is formed by the receiving pocket.

In a preferred embodiment of the present invention, the U-shaped end has a transverse stay positioned at a same level as the bottom edge.

In another embodiment of the present invention, the round transition has a radius of at least substantially half a length of the lateral edges. Preferably, the radius is two thirds of the length of the lateral edges.

When the cutting cord or cutting thread has an excess length, it is displaced due to the round transition of the lateral edge toward the bottom edge away from the cutting plane and according to this deflection runs against the obstacle in the form of the projection which in the direction of rotation of the cutting head is in front of the cutting blade. When contacting the projection, the excess length of the end section of the cutting thread is bent counter to the direction of rotation so that the cutting thread or cutting cord is forced inside the protective shield and is then cut by the crosscutting blade. Thus, the obstacle (projection) within the path of deflection ensures that even a cutting thread with excess length is securely shortened by the crosscutting blade so that it enters without problems into the area of the protective shield. The prescribed protective function is thus ensured.

Preferably, the projection is in the form of a step extending from the end of the round transition to the bottom edge. Advantageously, the round transition connects to an inlet section of the bottom edge wherein the inlet section is positioned at an axial distance to the bottom edge and wherein the projection in the form of the step connects the inlet section with the bottom edge. Preferably, the step in this manner provides an abutment surface in the direction of rotation which is preferably arranged perpendicular to the cutting plane.

The inventive embodiment of the protective shield allows for a round transition with a radius of at least half the height of the circumferential wall, preferably two thirds of the height of the circumferential wall, i.e., of the lateral edges. Such a strongly rounded transition prevents a hooking of the protective shield in plants or shrubs or at the ground when the operator during normal operation moves the free-cutting tool about. The obstacle in the form of the projection provided at the protective shield ensures that along the path of deflection of a cutting thread with excess length, the cutting thread is under any circumstances forced into the protective area of the protective shield. With the inventive measure the ease of manipulation of the inventive free-cutting tool is substantially increased.

Since the cross-cutting blade has one angular end connected to the support section and one U-shaped end that with its free leg is inserted into the receiving pocket at the circumferential wall, the cutting edge of the crosscutting blade extends over the entire height of the circumferential wall without having projecting parts that might lead to a hooking of the tool within the vegetation to be cut or on the ground.

DESCRIPTION OF PREFERRED EMBODIMENTS

The present invention will now be described in detail with the aid of several specific embodiments utilizing FIGS. 1 through 5.

The free-cutting tool 13 represented in FIG. 1 is carried and guided by an operator 11. A support belt 12 is strapped about the shoulder of the operator 11 and is preferably connected, approximately within the area of the point of gravity of the free-cutting tool 13, at a holder 3. The holder 3 is connected to the protective tube 1 which supports the cutting head 2 at its end 4 that faces the ground. The cutting head 2 is driven by a motor 6 via a drive shaft contained within the protective tube 1. The motor 6 is connected to the other end 5 of the protective tube 1. In the represented embodiment the motor 6 is an internal combustion engine. Of course, it is also possible to use an electric motor in the same manner.

The free-cutting tool 13 is guided with the aid of a handle 14 which is positioned at the protective tube 1 between the holder 3 and the end 4 and is fixedly connected to the tool. With the other handle 14*a*, by rotation of the grip, the gas throttle cable 15 for actuating the internal combustion engine 6 is operated.

The cutting head 2 has a cutting thread or cutting cord 7 which upon rotation of the cutting head 2 extends approximately radial to the axis of rotation 41 and defines a cutting plane 8 which, depending on how the free-cutting tool 13 is guided, is essentially parallel to the ground. In the area of the cutting tool facing the operator 11 the cutting plane 8 is provided with a protective shield 10 which covers a sector of the cutting plane 8.

The protective shield 10 is comprised substantially of a support section 9 which is positioned above the cutting plane 8 and, in the shown embodiment, is fixedly connected to the protective tube 1 of the tool 13. The support section 9 supports a circumferential wall 20 which extends in the direction of rotation 16 of the cutting head 2 over a circumferential portion of the cutting plane 8. Preferably, the circumferential wall 20 extends axially past the cutting plane 8 so that the circumferential (bottom) edge 21 remote from the support section 9 is closer to the ground G than the cutting plane 8.

As can be seen from the representations of FIGS. 2 and 5, the inside of the protective shield 10 facing the cutting head 2 is provided with a crosscutting blade 30 for cutting the cutting thread 7. The crosscutting blade 30 is substantially linearly embodied and at the end 31 facing the support section 9 is substantially L-shaped. A fastening screw 35 extending through the angular end 31 is inserted into a fastening bracket 19 of the support section 9 and fastens the cutting blade 30 with its end 31 to the support section 9. The crosscutting blade 30 is substantially perpendicular to the cutting plane 8 of the cutting head 2 whereby the other end is U-shaped and with its free leg 33 pointing in the direction of the support section 9 engages a receiving pocket 34 provided at the circumferential wall 20. The dimensions are such that upon tightening the fastening screw 35 the leg 33 of the U-shaped end 32 of the cross cutting blade 30 is fixed within the receiving pocket whereby the transverse stay 36 of the U-shaped end 32 in the axial direction is approximately positioned at the same level as the circumferential edge or bottom edge 21 of the circumferential wall 20 remote from the support section 9.

The embodiment and the arrangement of the crosscutting blade 30 is such that the cutting edge 37 of the crosscutting blade 30 is positioned in a plane 38 which forms a tangent to the circle 40 described by the cutting thread 7. The circumferential wall 20 has a radius of curvature relative to the circle 40 which is greater than the radius of the circle 40 of the cutting thread 7 whereby the point of origination of the radius of curvature of the circumferential wall 20 is displaced with respect to the point of origination of the radius of the circle 40. Accordingly, the leading lateral edge 22 at the leading portion 18 of the circumferential wall 20 in the direction of rotation 16 is positioned at a distance A to the circle 40. The distance a is reduced in the direction of rotation 16 to a minimal distance A between the circle 40 and the circumferential wall 20. In the thus defined leading portion 18 the cross cutting blade 30 is arranged.

The axially extending lateral edges 22 and 23 of the circumferential wall 20 have round transitions 26 into the bottom edge 21 of the circumferential wall 20. The axially extending lateral edges 22 and 23 extend perpendicularly to the axis of rotation 16. While at the exit portion 17 the round transition 26 uniformly changes over into the bottom edge 21, at the leading portion 18 the section 25 of the round transition 26 is provided with a projection 24 towards the bottom edge 21 which in the direction of rotation 16 of the cutting head 2 is in front of the crosscutting blade 30. Preferably, the projection 24 is arranged approximately at the level of the cutting edge 37 of the crosscutting blade 30.

In the shown embodiment the round transition 26 of the axially extending lateral edge 22 of the circumferential wall 20 in the direction of rotation 16 is connected within the leading portion 18 to an inlet section 210 of the bottom edge 21. This inlet section 210 extends preferably approximately parallel to the cutting plane and is closer to the support section 9 than the bottom edge 21 of the circumferential wall 20 which is substantially parallel to the cutting plane. The inlet section 210 thus has an axial distance u to the bottom edge 21 whereby the projection is the step 24 from the inlet section 210 to the bottom edge 21. The step 24 is provided with an abutment surface 27 in the direction of rotation 16 which preferably is perpendicular to the cutting plane 8. In the shown embodiment the step 24 is provided at the receiving pocket 34 for the crosscutting blade 30.

When a new cutting thread 7 is connected to the cutting head 2, the cutting thread in the first rotations is cut to length by the crosscutting blade 30 whereby the circle 40 and the cutting plane 8 of the cutting thread 7 are determined. When the cutting tool is provided with a magazine for the cutting thread, the required extension (feed) of the cutting thread is achieved during operation of the tool with a so-called advancing device which is actuated by an actuating member that is facing the ground G and which extends past the cutting plane 8 and the protective shield 10. An excess length of the cutting thread is then cut off by the crosscutting blade When the excess length V of the cutting thread 7 extending past the predetermined circle 40 is greater than the maximum distance A of the circumferential wall 20 from the circle 40 than the cutting thread with its extension 7*a* is guided by the lateral edge 22 of the circumferential wall 20 via the round transition 26 to the bottom edge 21 of the circumferential wall 20. The excess length 7*a* comes into contact with the step 24 so that the thread is bent and is forced behind the circumferential wall 20 into the protective shield 10. Since the step 24 is approximately positioned at the level of the crosscutting blade 30 in the direction of rotation 16 shortly before the cutting edge 37, the cutting thread 7 is shortened upon entering the protective shield and is conveyed farther within the area of the protective shield. The cut-off end of the cutting thread is caught by the protective shield and falls to the ground. Upon its next entry into the protective shield, the cutting thread is shortened at least to such an extent that it enters without obstruction the inlet area 39 and is then shortened by the crosscutting blade 30 to the desired cutting thread length in a reliable manner.

Since it is thus ensured that the cutting thread, even when it has excess length, is introduced into the area of the protective shield to be cut by the crosscutting blade, the height of the circumferential wall can be maintained at a minimum and the lateral edges can be strongly rounded so that an improved handling of the device results. The round transition 26 preferably has a radius R that is approximately half, especially two thirds, of the height H of the lateral edge 22 (FIG. 4).

The protective shield 10 is made of plastic material whereby for reducing the weight a small thickness of the wall is preferred. As can be seen in FIGS. 2 and 3, the support section 9 on its inwardly facing side is provided with reinforcement ribs 45 which extend radially and are connected to a recess 46 in the circumferential wall 20. The support section 9 is furthermore provided with inwardly extending limiting flanges 47 which on the side facing the circumferential wall 20 extend to the circumferential wall. On the side facing away from the circumferential wall 20 an outer reinforcement flange 48 extends. It begins at the radially inner end of the support section 9, extends farther via the lateral edge 22 to the bottom edge 21 and via the other lateral edge 23 to the other radial end of the support section 9. The height of the reinforcement flange 48 corresponds to the depth of the reinforcing recess 46 within the circumferential wall 20.

The present invention is, of course, in no way restricted to the specific disclosure of the specification and drawings, but also encompasses any modifications within the scope of the appended claims.

What we claim is:

1. A protective shield for a free-cutting tool, said free-cutting tool comprising a cutting head rotatable about an axis of rotation, said cutting head having a cutting thread extending substantially radially to said axis of rotation and defining a cutting plane upon rotation of said cutting head, said protective shield connected to said cutting head such that said cutting plane is within said protective shield, said protective shield comprising:

a support section for fixedly connecting said protective shield to said cutting tool above said cutting plane;

a circumferential wall connected to said support section and extending about a portion of a circumference of said cutting plane;

said circumferential wall extending axially from said support section to at least said cutting plane;

said circumferential wall having axially extending lateral edges extending perpendicular to said cutting plane;

said circumferential wall having a bottom edge, wherein said lateral edges have a round transition into said bottom edge;

a crosscutting blade for cutting to length said cutting thread, said crosscutting blade connected to an inner wall surface of said circumferential wall at a leading portion of said circumferential wall in said direction of rotation and extending substantially over an axial height of said circumferential wall; and wherein at said leading portion of said circumferential wall said round transition into said bottom edge has an axially extending projection positioned, when viewed in said direction of rotation, upstream of said crosscutting blade, said projection being a step between said round transition and said bottom edge.

2. A protective shield according to claim 1, wherein said projection is positioned substantially at a cutting edge of said crosscutting blade.

3. A protective shield according to claim 2, wherein said cutting edge is positioned in a plane that in a plan view forms a tangent to a circle described by said cutting thread.

4. A protective shield according to claim 3, wherein:

said circumferential wall has a first radius of curvature greater than a second radius of curvature of said circle described by said cutting thread; and a point of origination of said first radius is displaced with respect to a point of origination of said second radius.

5. A protective shield according to claim 1, wherein said round transition connects to an inlet section of said bottom edge, said inlet section being spaced at an axial distance to said bottom edge and wherein said step connects said inlet section to said bottom edge.

6. A protective shield according to claim 1, wherein said step has an abutment surface facing counter to said direction of rotation, said abutment surface being transverse to said cutting plane.

7. A protective shield according to claim 1, wherein:

said crosscutting blade has a first angular end for connecting it to said support section and a second U-shaped end with a free leg; and said circumferential wall has a receiving pocket for receiving said free leg.

8. A protective shield according to claim 7, wherein said step is formed by said receiving pocket.

9. A protective shield according to claim 7, wherein said U-shaped end has a transverse stay positioned at a same level as said bottom edge.

10. A protective shield according to claim 1, wherein said round transition has a radius of at least substantially half a length of said lateral edges.

11. A protective shield according to claim 10, wherein said radius is $\frac{2}{3}$ of said length of said lateral edges.

* * * * *